United States Patent
Arunan et al.

(10) Patent No.: US 9,325,382 B2
(45) Date of Patent: Apr. 26, 2016

(54) METHOD AND SYSTEM OF PROVIDING INTERNET PROTOCOL (IP) DATA COMMUNICATION IN A NFC PEER TO PEER COMMUNICATION ENVIRONMENT

(75) Inventors: Thenmozhi Arunan, Bangalore (IN); Jayabharath Reddy Badvel, Bangalore (IN); Venkata subba reddy Kota, Bangalore (IN); Eun-Tae Won, Seoul (KR)

(73) Assignee: Samsung Electronics Co., Ltd (KR)

( * ) Notice: Subject to any disclaimer, the term of this patent is extended or adjusted under 35 U.S.C. 154(b) by 94 days.

(21) Appl. No.: 14/000,323

(22) PCT Filed: Feb. 17, 2012

(86) PCT No.: PCT/KR2012/001200
§ 371 (c)(1),
(2), (4) Date: Aug. 19, 2013

(87) PCT Pub. No.: WO2012/111999
PCT Pub. Date: Aug. 23, 2012

(65) Prior Publication Data
US 2013/0322296 A1 Dec. 5, 2013

(30) Foreign Application Priority Data
Feb. 19, 2011 (IN) .............................. 483/CHE/2011

(51) Int. Cl.
*H04L 12/28* (2006.01)
*H04B 5/00* (2006.01)
(Continued)

(52) U.S. Cl.
CPC .............. *H04B 5/0031* (2013.01); *H04L 61/20* (2013.01); *H04L 61/2038* (2013.01); *H04W 76/023* (2013.01)

(58) Field of Classification Search
CPC .. H04B 5/0031; H04W 76/023; H04W 76/02; H04W 28/18; H04W 84/18; H04L 61/2038; H04L 69/24; G06K 7/10237
See application file for complete search history.

(56) References Cited

U.S. PATENT DOCUMENTS

| 8,634,771 B2 * | 1/2014 | Hassan et al. ................. 455/41.1 |
| 2004/0162871 A1 * | 8/2004 | Pabla et al. .................... 709/201 |

(Continued)

FOREIGN PATENT DOCUMENTS

| CN | 1799244 | 7/2006 |
| CN | 101233699 | 7/2008 |

(Continued)

OTHER PUBLICATIONS

PCT/ISA/237 Written Opinion issued on PCT/KR2012/001200 (pp. 6).

(Continued)

*Primary Examiner* — Hoang-Chuong Vu
(74) *Attorney, Agent, or Firm* — The Farrell Law Firm, P.C.

(57) ABSTRACT

The present invention provides a method and system of providing Internet Protocol data communication in a NFC peer-to-peer mode communication environment, wherein a NFC peer to peer link is established between an initiator NFC device and a target NFC device, a first configuration frame containing IP configuration parameters associated with the initiator NFC device is transmitted to the target NFC device via a NFC interface, a second configuration frame containing IP configuration parameters associated with the target NFC device is received from the target NFC device via the NFC interface in response to the first configuration frame, and an IP communication is set up with the target NFC device over the NFC interface based on the IP configuration parameters associated with the target NFC device and IP data is exchanged with the target NFC device over the NFC interface in a NFC peer to peer mode.

22 Claims, 7 Drawing Sheets

(51) Int. Cl.
*H04L 29/12* (2006.01)
*H04W 76/02* (2009.01)

(56) References Cited

U.S. PATENT DOCUMENTS

| | | | |
|---|---|---|---|
| 2005/0007962 A1* | 1/2005 | Nam | H04L 29/12018 370/252 |
| 2006/0002328 A1* | 1/2006 | Naghian | 370/328 |
| 2006/0199536 A1* | 9/2006 | Eisenbach | 455/41.2 |
| 2007/0001853 A1* | 1/2007 | Otranen | 340/572.1 |
| 2008/0090520 A1 | 4/2008 | Camp et al. | |
| 2008/0226071 A1* | 9/2008 | Braskich et al. | 380/258 |
| 2009/0104875 A1 | 4/2009 | Naniyat | |
| 2009/0170483 A1 | 7/2009 | Barnett et al. | |
| 2009/0227282 A1 | 9/2009 | Miyabayashi et al. | |
| 2009/0327713 A1* | 12/2009 | Marin et al. | 713/168 |
| 2010/0077063 A1* | 3/2010 | Amit et al. | 709/221 |
| 2010/0174801 A1 | 7/2010 | Tabaaloute | |
| 2010/0254349 A1 | 10/2010 | Aibara et al. | |
| 2011/0010458 A1* | 1/2011 | Das et al. | 709/227 |
| 2011/0106947 A1* | 5/2011 | Lin | 709/225 |
| 2011/0275316 A1* | 11/2011 | Suumaki et al. | 455/41.1 |
| 2011/0312278 A1* | 12/2011 | Matsushita | H04L 12/40013 455/66.1 |
| 2012/0100803 A1* | 4/2012 | Suumaki et al. | 455/41.1 |
| 2012/0106429 A1* | 5/2012 | Hong et al. | 370/312 |
| 2015/0237172 A1 | 8/2015 | Hein-Magnussen | |

FOREIGN PATENT DOCUMENTS

| | | |
|---|---|---|
| EP | 1 845 694 | 10/2007 |
| JP | 2005-033765 | 2/2005 |
| JP | 2008-545312 | 12/2008 |
| JP | 2009-218845 | 9/2009 |
| JP | 2010-093430 | 4/2010 |
| JP | 2010-245748 | 10/2010 |
| WO | WO 2007/004010 | 1/2007 |
| WO | WO 2007/072266 | 6/2007 |

OTHER PUBLICATIONS

PCT/ISA/210 Search Report issued on PCT/KR2012/001200 (pp. 4).
Chinese Office Action dated Nov. 25, 2015 issued in counterpart application No. 201280013157.7, 12 pages.
Japanese Office Action dated Feb. 8, 2016 issued in counterpart application No. 2013-554397, 6 pages.
Stefan Grunberger et al., "Analysis and Test Results of Tunneling IP over NFCIP-1", 2009 First International Workshop on Near Field Communication, Feb. 24, 2009, 5 pages.
European Search Report dated Mar. 2, 2016 issued in counterpart application No. 12747490.6-1870, 7 pages.

* cited by examiner

Fig. 5

| ROLE TYPE | VALUE |
|---|---|
| AD | 0 |
| DWNC | 1 |

| NI TYPE | VALUES (7 BITS) |
|---|---|
| ETHERNET | 0X01 |
| TOKEN RING | 0X02 |
| FDDI | 0X03 |
| PSTN | 0X04 |
| ISDN | 0X05 |
| DSL | 0X06 |
| CABLE MODEM | 0X07 |
| GSM | 0X08 |
| CDMA | 0X09 |
| GPRS | 0X0A |
| 3G | 0X0B |
| LTE | 0X0C |
| OTHER | 0X7E |
| UNKNOWN | 0X7F |

600

METHOD AND SYSTEM OF PROVIDING INTERNET PROTOCOL (IP) DATA COMMUNICATION IN A NFC PEER TO PEER COMMUNICATION ENVIRONMENT

PRIORITY

This application is a National Phase entry of PCT/KR12/001200 and claims priority under 35 U.S.C. §119(a) to Indian Patent Application Serial No. 483/CHE/2011, which was filed in the Indian Patent Office on Feb. 19, 2011, the entire content of each is incorporated herein by reference.

BACKGROUND OF THE INVENTION

1. Field of the Invention

The present invention generally relates to the field of near field communication (NFC), and more particularly relates to a method and system for enabling Internet Protocol (IP) data communication in a NFC peer to peer communication environment.

2. Background Art

Near Field Communication is used in devices for communicating with other device in a network range of less than 10 cm. In NFC system, devices communicate to each other using a read-write mode or peer-to-peer mode. NFC peer-to-peer mode provides communication channel between NFC enabled devices to exchange data in a point-to-point communication manner. That is, both the NFC enabled devices have similar communication capabilities and hence the devices can communicate irrespective of role of devices.

The Internet, a world wide network of connected computers, provides multi-media content to consumers. Internet Protocol (IP) is an internetwork protocol that defines how to format various multi-media content into IP data packets and transmit those packets using the Internet. IP provides near universal delivery system that can operate on almost any underlying network.

SUMMARY OF THE INVENTION

In peer-to-peer mode, currently known NFC enabled devices do not support exchange of IP data packets over an NFC interface, thereby causing inconvenience to user in exchanging or access IP data using NFC interface.

Solution to Problem

Accordingly, the present invention provides a method and system that can support exchange of IP data packets over an NFC interface.

In accordance with an aspect of the present invention, there is provided a method of providing Internet Protocol (IP) data communication in a near field communication (NFC) peer to peer communication environment. The method comprises establishing a NFC peer to peer link between an initiator NFC device and a target NFC device; transmitting a first configuration frame containing IP configuration parameters associated with the initiator NFC device to the target NFC device via a NFC interface; receiving a second configuration frame containing IP configuration parameters associated with the target NFC device via the NFC interface in response to the first configuration frame; setting up an IP communication with the target NFC device over the NFC interface based on the IP configuration parameters associated with the target NFC device; and exchanging IP data with the target NFC device over the NFC interface in a NFC peer to peer mode upon successfully setting up the IP communication.

In accordance with another aspect of the present invention, there is provided a method of providing Internet Protocol (IP) data communication in a near field communication (NFC) peer to peer communication environment. The method comprises establishing a NFC peer to peer link between an initiator NFC device and a target NFC device; receiving a first configuration frame containing IP configuration parameters associated with the initiator NFC device from the initiator NFC device via a NFC interface; transmitting a second configuration frame containing IP configuration parameters associated with the target NFC device to the initiator NFC device via the NFC interface in response to the first configuration frame; setting up an IP communication with the initiator NFC device over the NFC interface based on the IP configuration parameters associated with the initiator NFC device; and exchanging IP data with the initiator NFC device over the NFC interface in a NFC peer to peer mode upon successfully setting up the IP communication.

In accordance with another aspect of the present invention, there is provided an apparatus providing Internet Protocol (IP) data communication in a near field communication (NFC) peer to peer communication environment. The apparatus comprises a radio frequency unit; a processor; and memory coupled to the processor, wherein the memory comprises an IP communication module configured for: establishing a NFC peer to peer link with a target NFC device; transmitting a first configuration frame containing IP configuration parameters to the target NFC device via a NFC interface; receiving a second configuration frame containing IP configuration parameters associated with the target NFC device via the NFC interface in response to the first configuration frame; setting up an IP communication with the target NFC device over the NFC interface based on the IP configuration parameters associated with the target NFC device; and exchanging IP data with the target NFC device over the NFC interface in a NFC peer to peer mode upon successfully setting up the IP communication.

In accordance with another aspect of the present invention, there is provided a system providing Internet Protocol (IP) data communication in a near field communication (NFC) peer to peer communication environment. The system comprises an initiator NFC device; and a target NFC device connected to the initiator NFC device via a near field communication (NFC) interface, wherein the initiator NFC device is configured for establishing a NFC peer to peer link with the target NFC device and transmitting a first configuration frame containing IP configuration parameters associated with the initiator NFC device to the target NFC device via a NFC interface, and wherein the target NFC device is configured for sending a second configuration frame containing IP configuration parameters associated with the target NFC device to the initiator NFC device via the NFC interface in response to the first configuration frame, and wherein the initiator NFC device and the target NFC device are configured for substantially simultaneously setting up an IP communication over the NFC interface based on the IP configuration parameters associated with the initiator NFC device and the target NFC device and exchanging IP data over the NFC interface in a NFC peer to peer mode upon successfully setting up the IP communication.

The present invention provides a method and system that can support exchange of IP data packets over an NFC interface.

data over a NFC interface in a NFC peer-to-peer mode, according to one embodiment.

Figure 2:
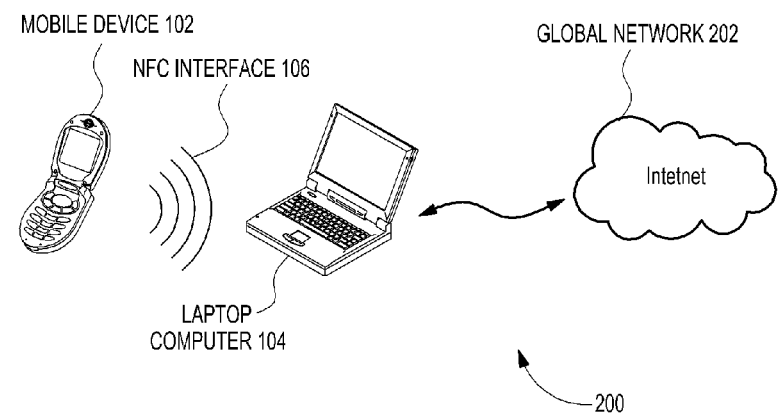

FIG. 2 is a system diagram illustrating near field communication (NFC) devices exchanging IP data over a NFC interface in a NFC peer-to-peer mode, according to another embodiment.

Figure 3:
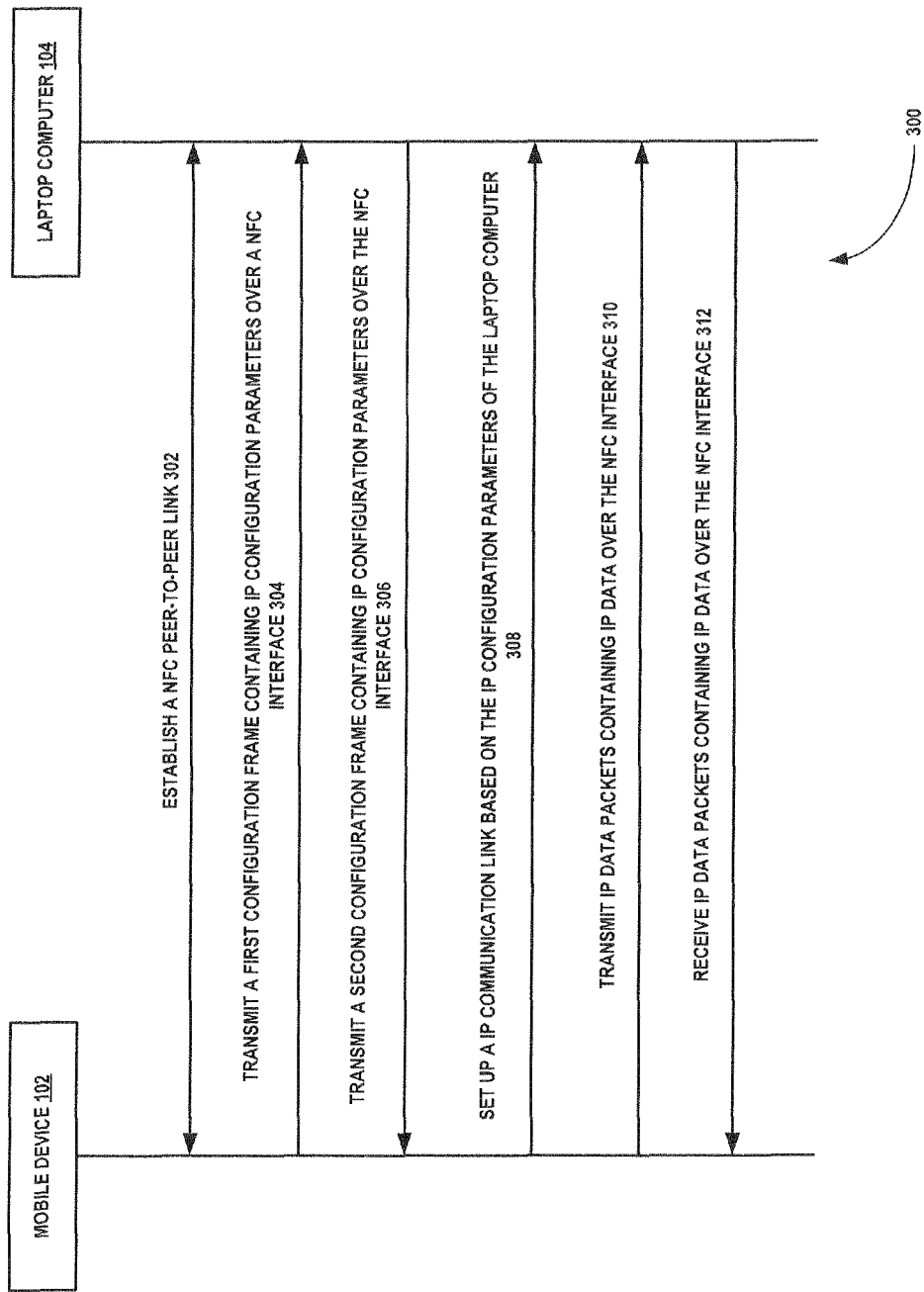

FIG. 3 is a flow diagram illustrating an exemplary method of exchanging IP data packets between a mobile device and a laptop computer over a NFC interface, according to one embodiment.

Figure 4:
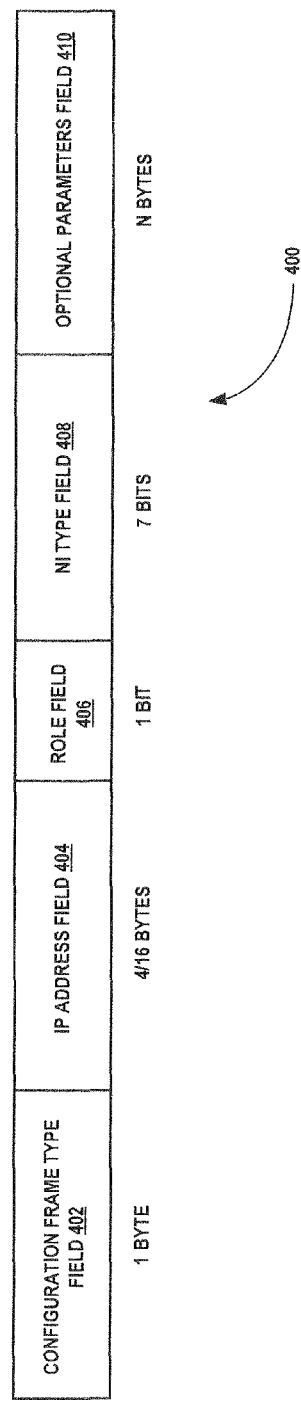

FIG. 4 is a schematic representation of an exemplary configuration frame used for communicating IP configuration parameters between the mobile device and the laptop computer, according to one embodiment.

FIG. 5 is a tabular view depicting values carried in the role field of the configuration frame such as those shown in FIG. 4 for indicating a role of a NFC device, according to one embodiment.

FIG. 6 is a tabular view depicting values corresponding to network interface types carried in the network interface type field of the configuration frame such as those shown in FIG. 4 for indicating a network interface type supported by a NFC device, according to one embodiment.

Figure 7:
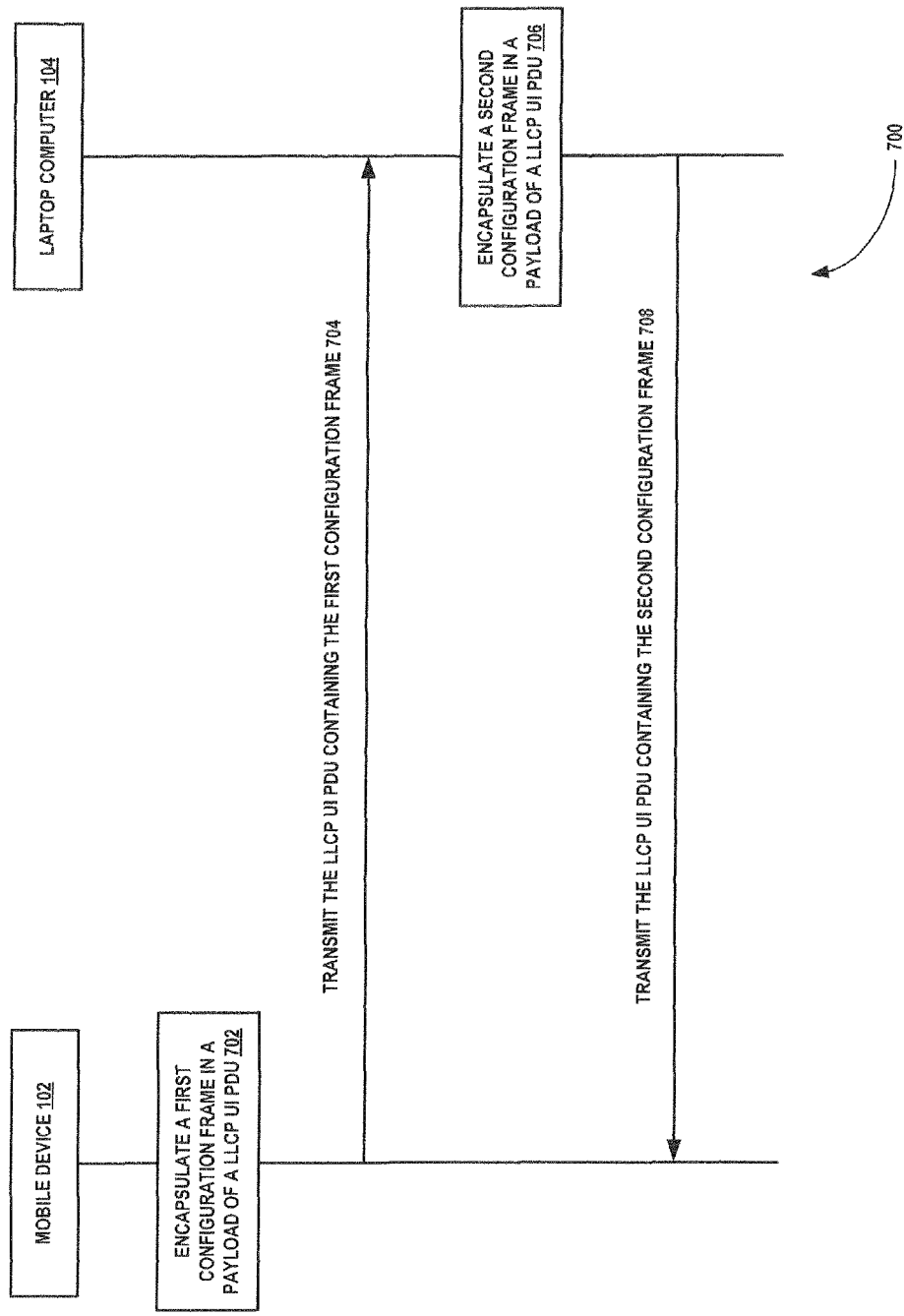

FIG. 7 is a flow diagram illustrating an exemplary method of communicating configuration frames containing IP configuration parameters between the mobile device and the laptop computer, according to one embodiment.

Figure 8:
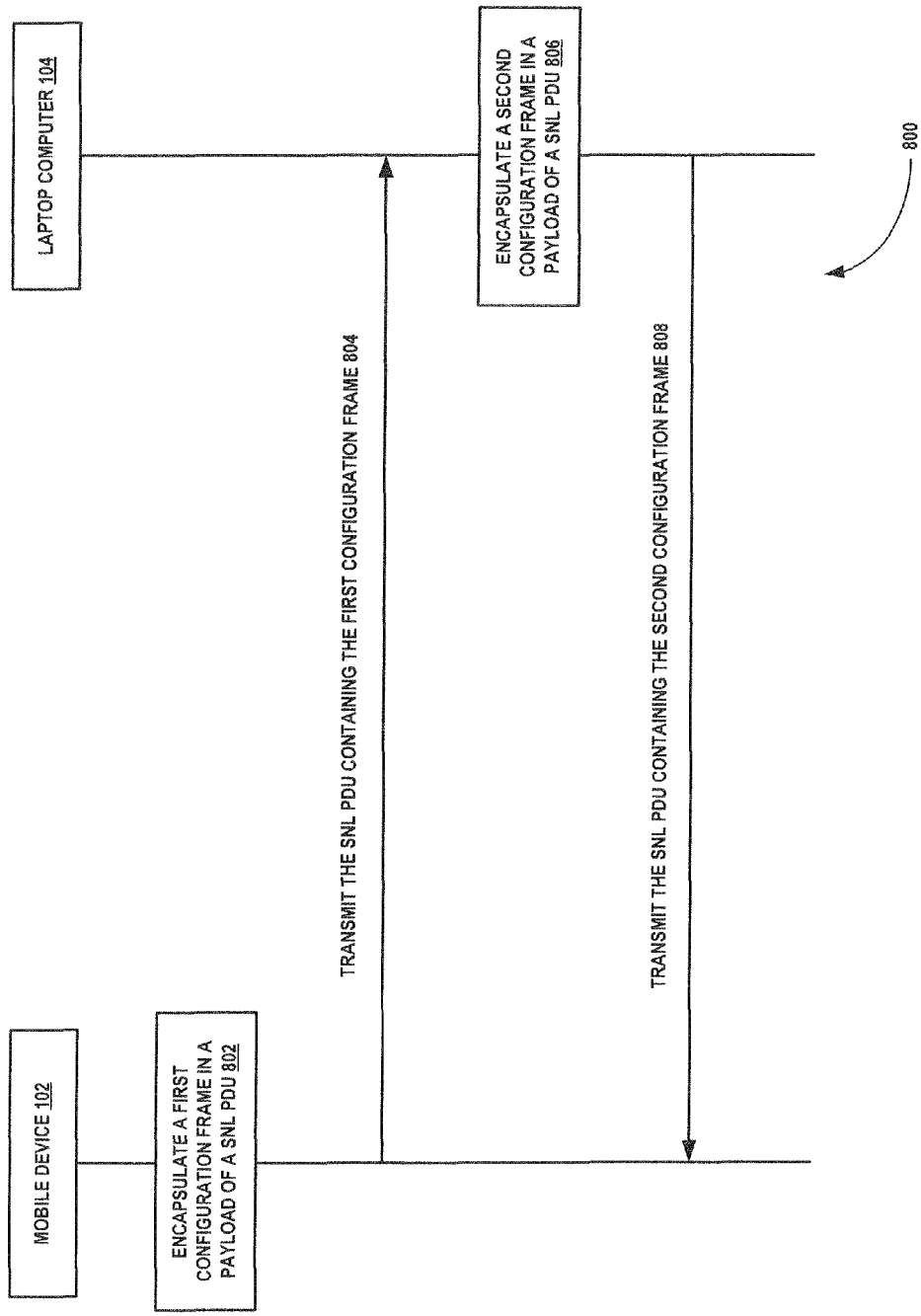

FIG. 8 is a flow diagram illustrating an exemplary method of communicating configuration frames containing IP configuration parameters between the mobile device and the laptop computer, according to another embodiment.

Figure 9:
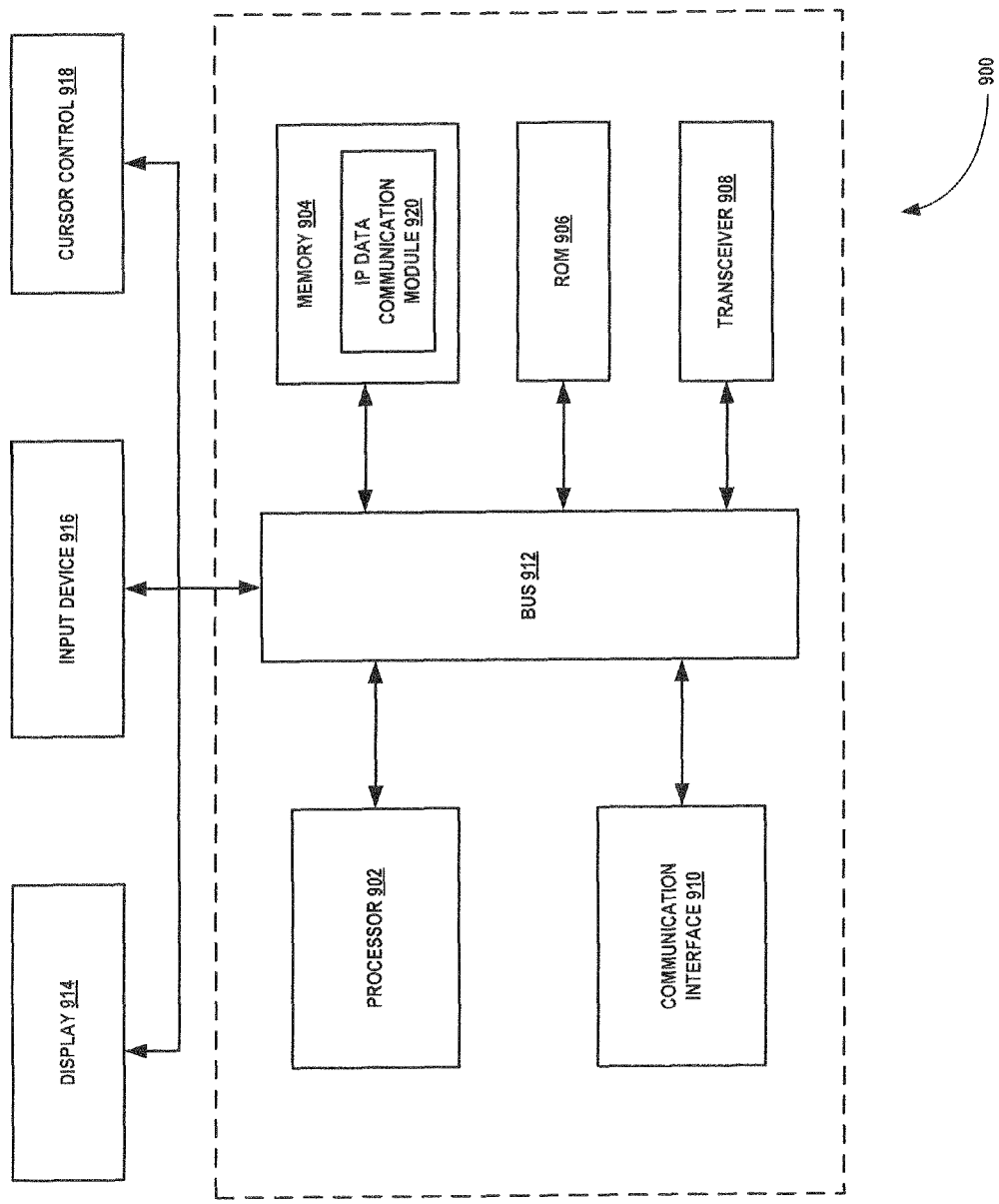

FIG. 9 illustrates a block diagram of a NFC device showing various components for implementing embodiments of the present subject matter.

The drawings described herein are for illustration purposes only and are not intended to limit the scope of the present disclosure in any way.

DETAILED DESCRIPTION OF THE PRESENT INVENTION

The present invention provides a method and system of providing Internet Protocol (IP) data communication in a near field communication environment. In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore, not to be taken in a limiting sense, and the scope of the present invention is defined only by the appended claims.

Figure 1:
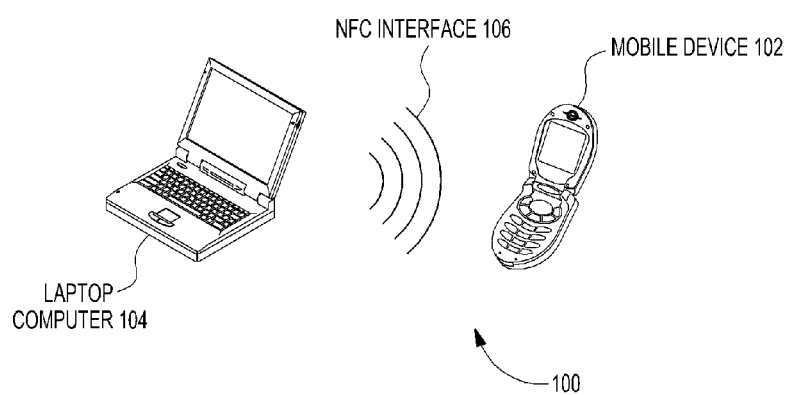
FIG. 1 is a system diagram illustrating near field communication (NFC) devices exchanging Internet Protocol (IP)

FIG. 1 is a system diagram 100 illustrating near field communication (NFC) devices 102 and 104 exchanging IP data over a NFC interface in a peer-to-peer mode, according to one embodiment. Particularly, FIG. 1 illustrates a mobile device 102 and a laptop computer 104 capable of interacting with each other over a NFC interface 106 in a NFC peer-to-peer mode.

The mobile device 102 and a laptop computer 104 are configured for communicating IP data packets containing IP data over the NFC interface 106 (e.g., a NFC logical link control protocol (LLCP) interface) in a NFC peer-to-peer mode of operation. In a peer-to-peer mode of operation, the mobile device 102 or the laptop computer 104 may initiate near field communication with each other. A NFC device which initiates a communication is known as an initiator NFC device, while a NFC device which listens to the initiator NFC device is known as a target NFC device.

Consider a scenario in which the mobile device 102 wishes to exchange IP data with the laptop computer 104 over the NFC interface 106. In such case, the mobile device 102 acts as an initiator NFC device and the laptop computer 104 acts as a target NFC device. The interaction between the mobile device 102 and the laptop computer 104 for providing IP data communication over the NFC interface in a NC peer-to-peer mode is illustrated in FIG. 3. Referring to FIG. 3 computer 104 includes a configuration type, an IP address associated with the laptop computer 104, a role of the laptop computer 104, and a network interface type supported by the laptop computer 104.

Accordingly, the mobile device 102 sets up an IP communication with the laptop computer 104 over the NFC interface 106 using the IP address associated with the laptop computer 102, at step 308. Upon successfully establishment of the link, the mobile device 102 and the laptop computer 104 exchanges IP data packets including IP data (e.g., music files, video files, text documents, application files, and the like) over the NFC interface based on the IP configuration parameters exchanged prior to establishment of the IP communication. The exchanging of the IP data packets is depicted in steps 310 and 312 of FIG. 3. At step 310, the mobile device 102 transmits IP data packets containing IP data to the laptop computer 104 over the NFC interface in the NFC peer-to-peer mode. At step 312, the laptop computer 104 may send IP data packets containing IP data to the mobile device 102 over the NFC interface 106 in the NFC peer-to-peer mode. In this manner, the present invention enables the NFC enabled devices 102 and 104 to locally exchange IP data over the NFC interface 106.

It can be noted that, both the mobile device 102 and the laptop computer 104 are having adhoc devices since the devices 102 and 104 share IP data that is locally available to them. NFC devices with adhoc role do not have access to a global network (e.g., Internet). Alternatively, one of the devices 102 and 104 can have a device with wider network connectivity (DWNC) role as illustrated in FIG. 2. As discussed earlier, the mobile device 102 and the laptop computer 104 indicate their respective role associated with them in the configuration frame such that the mobile device 102 and the laptop computer 104 can understand each other's role and network interface capabilities.

FIG. 2 is a system diagram 200 illustrating the near field communication (NFC) devices 102 and 104 exchanging IP data over a NFC interface in a peer-to-peer mode, according to another embodiment. In FIG. 2, the laptop computer 104 is having access to a global network 202 while the mobile device 102 is not having any access to the global network 202. When the laptop computer 104 receives a configuration frame including the IP configuration parameters from the mobile device 102, the laptop computer 104 responds with a response configuration frame including IP configuration parameters associated with the laptop computer 104, where IP configuration parameters indicate the role type as DWNC and the network interface supported by the laptop computer 104.

Based on the role type indicated in the configuration frame, the mobile device 102 identifies that the laptop computer 104 can act as a gateway and can assist the mobile device 102 to access the global network 202 over the NFC interface 106. Accordingly, the mobile device 102 sends a request for IP data to the laptop computer 104. The laptop computer 104 fetches the requested IP data and sends IP data packets containing fetched IP data to the mobile device 104 over the NFC interface 106 in a NFC peer-to-peer mode. Thus, the laptop computer 104 acts as a gateway between the global network 202 and the mobile device 102, where the communication between the mobile device 102 and the laptop computer 104 is performed in a NFC peer-to-peer mode over the NFC interface 106. One can envision that, when the mobile device 102 is connected to the global network 202 and the laptop computer 104 is adhoc device, the mobile device 102 acts as a gateway between the laptop computer 104 and the global network 202.

One skilled in the art will realise that the present invention does require implementing address resolution protocol (ARP) or Duplicate address detection technique for advertising IP address to resolve hardware address since the NFC LLCP interface 106 does not support hardware address such as Ethernet MAC address. This helps save significant amount of time required for setting up IP communication between the mobile device 102 and the laptop computer 104. In one embodiment, the mobile device 102 and the laptop computer 104 dynamically generates an ARP table containing IP addresses using the IP configuration parameters associated with the mobile device 102 and the laptop computer 104 respectively. This is the case when the IP addresses assigned to the mobile device 102 and the laptop computer are based on Internet Protocol Version 4. In another embodiment, the mobile device 102 and the laptop computer 104 dynamically resolves collision of duplicate IP addresses based on the IP configuration parameters associated with the mobile device 102 and the laptop computer 104 respectively. This is the case when the IP addresses assigned to the mobile device 102 and the laptop computer are based on Internet Protocol Version 6.

FIG. 4 is a schematic representation of an exemplary configuration frame 400 used for communicating IP configuration parameters between the mobile device 102 and the laptop computer 104, according to one embodiment. The configuration frame 400 includes a configuration type field 402, an IP address field 404, a role field 406, a network interface field 408, and optional parameters field 410 for carrying IP configuration parameters.

The configuration type field 402 identifies the configuration frame. The IP address field 404 includes an IP address assigned to a NFC device transmitting the configuration frame 400 to another NFC device. For example, if the mobile device 102 transmits the configuration frame 400 to the laptop computer 104, the IP address field 404 includes an IP address associated with the mobile device 102. The IP address field 404 may include a IPv4 address of 4 bytes size or a IPv6 address of 16 bytes in size.

The role field 406 indicates a role of a NFC device transmitting the configuration frame 400. For example, as shown in FIG. 5, the role field 406 may include a value '0' which indicates that the NFC device is having an Adhoc role. Alternatively, the role field 406 may include a value '1' when the role associated with the NFC is a DWNC role.

The network interface type field 408 indicates a network interface supported by the NFC device. As depicted in FIG. 6, the network interface type field 408 can take any of the values in the table 600 to indicate that a network interface that is currently supported by the NFC device. For example, the network interface type field 408 includes a value '0x01' when the NFC device is having access to the Ethernet Network.

The information in the role field 406 and the network interface type field 408 enables another NFC device to identify whether the NFC device is connected to the global network 202 so that said another NFC device can access the global network 202 via the NFC device. The optional parameter field 410 may include information such as network prefix, remote device IP address, etc.

FIG. 7 is a flow diagram 700 illustrating an exemplary method of communicating configuration frames containing IP configuration information between the mobile device 102 and the laptop computer 104, according to one embodiment. At step 702, the mobile device 102 encapsulates a first configuration frame containing IP configuration parameters associated with the mobile device 102 in a payload of a LLCP Un-numbered Information (UI) Packet Data Unit (PDU). In some embodiments, upon registration of IP service with a LLCP layer of the mobile device 102, the LLCP layer gets an IP address which is then encapsulated along with other IP configuration parameters in the configuration frame by the LLCP layer. Then, at step 704, the mobile device 102 transmits the LLCP UI PDU including the first configuration frame to the laptop computer 104.

At step 706, the laptop computer 104 encapsulates a second configuration frame containing IP configuration parameters associated with the laptop computer 104 in a payload of a LLCP UI PDU. In some embodiments, upon reception of the LLCP UI PDU, a LLCP layer of the laptop computer 104 obtains an IP address from an IP layer which is then encapsulated along with other IP configuration parameters in the configuration frame by the LLCP layer. In these embodiments, the laptop computer 104 checks whether the IP address of the mobile device 102 is not same as the IP address of the laptop computer 104 so as to identify duplicate IP addresses, thereby preventing an elaborate upper layer protocol being executed to deduct duplicate IP addresses. At step 708, the laptop computer 104 transmits the LLCP UI PDU containing the configuration frame to the mobile device 102. If the mobile device 102 does not receive the LLCP UI PDU encapsulating the IP configuration parameters of the laptop computer 104, the mobile device 102 resends the LLCP UI PDU encapsulating the IP configuration parameters of the mobile device 102 till the mobile device 102 receives a response from the laptop computer 104. Furthermore, upon receiving the configuration parameters, the mobile device 102 sets up an IP communication between the mobile device 102 and the laptop computer 104 and exchanges IP data packets containing IP data with the laptop computer 104 over the NFC interface 106 as described in FIG. 3.

FIG. 8 is a flow diagram 800 illustrating an exemplary method of communicating configuration frames containing IP configuration information between the mobile device 102 and the laptop computer 104, according to another embodiment. At step 802, the mobile device 102 encapsulates a first configuration frame containing IP configuration parameters associated with the mobile device 102 in a payload of a Service Name Lookup (SNL) packet data unit (PDU). In some embodiments, upon registration of IP service with a LLCP layer of the mobile device 102, the LLCP layer gets an IP address which is then encapsulated along with other IP configuration parameters in the configuration frame by the LLCP layer. Then, at step 804, the mobile device 102 transmits the SNL PDU including the first configuration frame to the laptop computer 104.

At step 806, the laptop computer 104 encapsulates a second configuration frame containing IP configuration parameters associated with the laptop computer 104 in a payload of a SNL PDU. In some embodiments, upon reception of the SNL PDU, a LLCP layer of the laptop computer 104 obtains an IP address from an IP layer which is then encapsulated along with other IP configuration parameters in the configuration frame by the LLCP layer. In these embodiments, the laptop computer 104 checks whether the IP address of the mobile device 102 is not same as the IP address of laptop computer 104 so as to identify duplicate IP addresses, thereby preventing an elaborate upper layer protocol being executed to deduct duplicate IP addresses. At step 808, the laptop computer 104 transmits the SNL PDU containing the configuration frame to the mobile device 102. If the mobile device 102 does not receive the SNL PDU encapsulating the IP configuration parameters of the laptop computer 104, the mobile device 102 resends the SNL PDU encapsulating the IP configuration parameters of the mobile device 102 till the mobile device 102 receives a response from the laptop computer 104. Furthermore, upon receiving the configuration parameters, the mobile device 102 sets up an IP communication between the mobile device 102 and the laptop computer 104 and exchanges IP data packets containing IP data with the laptop computer 104 over the NFC interface 106 as described in FIG. 3.

In one exemplary implementation, the mobile device 102 sends the SNL PDU with a SDREQ (URI for IP) and the laptop computer 104 responds with an SNL PDU including SDRES parameter, IP Address, a gateway flag, a gateway network address, and a network interface type to the mobile device 102. Similarly, the laptop computer 104 initiates a service discovery procedure for an IP service to the mobile device 102 by sending the SNL PDU with the SDREQ (URI for IP) and the mobile device 102 responds with an SNL PDU including a SDRES parameter, IP Address, a gateway flag, a gateway network address, and network interface type to the laptop computer 104. It can be noted that, the configuration frame type field 402 as depicted in FIG. 4 is in TLV format of the SNL PDU.

In case both the mobile device 102 and the laptop computer 104 chooses the same IP address, the second SNL PDU with SDRES returns with a failure message indicating duplicate IP address; then the configuration frame with new IP configuration parameters has to be re-sent after selecting a different IP address. It is appreciated that, the NFC devices 102 and 104 may assign IPv4 address using a protocol like Auto IP protocol (RFC 3927), and IPv6 address using a stateless autoconfiguration protocol (RFC 2462) or any other similar protocol that can assign well defined IP addresses. Also, each device can choose a random interval prior to re-sending a SNL PDU/UI PDU so that the configuration frame from one NFC device can be received and processed by the other NFC device.

FIG. 9 is a block diagram of a NFC device 900 showing various components for implementing embodiments of the present subject matter. In FIG. 9, the NFC device 900 includes a processor 902, memory 904, a read only memory (ROM) 906, a transceiver 908, a bus 912, a communication interface 910, a display 914, an input device 916, and a cursor control 918. It is appreciated that, the NFC device 900 is an exemplary embodiment of the mobile device 102 and the laptop computer 104 of FIGS. 1 and 2.

The processor 902, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a graphics processor, a digital signal processor, or any other type of processing circuit. The processor 902 may also include embedded controllers, such as generic or programmable logic devices or arrays, application specific integrated circuits, single-chip computers, smart cards, and the like.

The memory 904 and the ROM 906 may be volatile memory and non-volatile memory. The memory 904 includes an IP data communication module 106 for enabling IP data communication with other NFC devices over the NFC interface 106 in a NFC peer-to-peer mode, according to one or more embodiments described above. A variety of computer-readable storage media may be stored in and accessed from the memory elements. Memory elements may include any suitable memory device(s) for storing data and machine-readable instructions, such as read only memory, random access memory, erasable programmable read only memory, electrically erasable programmable read only memory, hard drive, removable media drive for handling compact disks, digital video disks, diskettes, magnetic tape cartridges, memory cards, Memory Sticks™, and the like.

Embodiments of the present subject matter may be implemented in conjunction with modules, including functions, procedures, data structures, and application programs, for performing tasks, or defining abstract data types or low-level hardware contexts. Machine-readable instructions stored on any of the above-mentioned storage media may be executable by the processor 902. For example, a computer program may include machine-readable instructions capable of performing one or more steps for enabling IP data communication with other NFC devices over a NFC interface in a NFC peer-to-peer mode, according to the teachings and herein described embodiments of the present subject matter. In one embodiment, the program may be included on a compact disk-read only memory (CD-ROM) and loaded from the CD-ROM to a hard drive in the non-volatile memory.

The transceiver 908 may be capable of transmitting a first configuration frame including IP configuration parameters to the receiving NFC device, receiving a second configuration frame including IP configuration parameters in response to the first configuration frame, and transmitting and receiving IP data packets containing media content over the NFC interface in a NFC peer-to-peer mode. The bus 912 acts as interconnect between various components of the NFC device 102. The components such as communication interfaces 910, the display 914, the input device 916, and the cursor control 918 are well known to the person skilled in the art and hence the explanation is thereof omitted.

The present embodiments have been described with reference to specific example embodiments, it will be evident that various modifications and changes may be made to these embodiments without departing from the broader spirit and scope of the various embodiments. Furthermore, the various devices, modules, and the like described herein may be enabled and operated using hardware circuitry, for example, complementary metal oxide semiconductor based logic circuitry, firmware, software and/or any combination of hardware, firmware, and/or software embodied in a machine readable medium. For example, the various electrical structure and methods may be embodied using transistors, logic gates, and electrical circuits, such as application specific integrated circuit.

The invention claimed is:

1. A method of providing internet protocol (IP) data communication in a near field communication (NFC) peer-to-peer communication environment, comprising:

establishing an NFC peer-to-peer link between an initiator NFC device and a target NFC device;

transmitting, by the initiator NFC device, a first configuration frame comprising IP configuration parameters associated with the initiator NFC device to the target NFC device via a NFC interface;

receiving, by the initiator NFC device, a second configuration frame comprising IP configuration parameters associated with the target NFC device via the NFC interface in response to the first configuration frame;

identifying, by the initiator NFC device, whether a first IP address of the initiator NFC device comprised in the first configuration frame is identical to a second IP address of the target NFC device comprised in the second configuration frame;

if the first IP address of the initiator NFC device is identical to the second IP address of the target NFC device, transmitting, by the initiator NFC device, a message indicating failure to the target NFC device and identifying, by the initiator NFC device, a third IP address of the initiator NFC device to transmit the third IP address to the target NFC device;

setting up, by the initiator NFC device, an IP communication with the target NFC device over the NFC interface based on the IP configuration parameters associated with the target NFC device; and exchanging by the initiator NFC device, IP data with the target NFC device over the NFC interface in an NFC peer-to-peer mode if the IP communication is set up.

2. The method of claim 1, wherein the IP configuration parameters associated with the initiator NFC device comprise a configuration frame type, the first IP address of the initiator NFC device, a role associated with the initiator NFC device, and a network interface type supported by the initiator NFC device.

3. The method of claim 1, wherein the IP configuration parameters associated with the target NFC device comprise a configuration frame type, the second IP address of the target NFC device, a role associated with the target NFC device, and a network interface type supported by the target NFC device.

4. The method of claim 1, wherein exchanging the IP data with the target NFC device over the NFC interface if the IP communication is set up comprises:
transmitting at least one IP data packet comprising IP data to the target NFC device over the NFC interface in the NFC peer-to-peer mode using the IP configuration parameters associated with the target NFC device.

5. The method of claim 4, wherein transmitting the at least one IP data packet comprising the IP data to the target NFC device over the NFC interface in the NFC peer-to-peer mode comprises:
receiving a request to provide access to a global network from the target NFC device;
fetching IP data from the global network based on the request received from the target NFC device;
encapsulating the fetched IP data in a payload of a packet data unit; and
transmitting the packet data unit comprising the fetched IP data to the target NFC device over the NFC interface in the NFC peer-to-peer mode.

6. The method of claim 1, wherein exchanging the IP data with the target NFC device over the NFC interface if the IP communication is set up comprises:
receiving at least one IP data packet comprising IP data from the target NFC device over the NFC interface.

7. The method of claim 6, wherein receiving the at least one IP data packet comprising the IP data from the target NFC device over the NFC interface in the NFC peer-to-peer mode comprises:
determining whether the target NFC device is connected to a global network based on the IP configuration parameters associated with the target NFC device;
sending a request to provide access to the global network to the target NFC device if the target NFC device is connected to the global network; and
receiving at least one IP data packet comprising IP data from the target NFC device over the NFC interface.

8. The method of claim 1, wherein setting up the IP communication with the target NFC device over the NFC interface based on the IP configuration parameters associated with the target NFC device comprises:
dynamically generating an ARP table based on the IP configuration parameters in the second configuration frame.

9. The method of claim 1, wherein setting up the IP communication with the target NFC device over the NFC interface based on the IP configuration parameters associated with the target NFC device comprises:
dynamically resolving duplicate addresses based on the IP configuration parameters in the second configuration frame.

10. The method of claim 1, further comprising:
encapsulating, by the initiator NFC device, the first configuration frame comprising the IP configuration parameters associated with the initiator NFC device in a payload of a first packet data unit,
wherein the first packet data unit including the first configuration frame is transmitted to the target NFC device via an NFC interface.

11. The method of claim 10, wherein the second configuration frame is comprised in a second packet data unit.

12. An initiator near field communication (NFC) device configured to provide internet protocol (IP) data communication in an NFC peer-to-peer communication environment, the initiator NFC device comprising:
a transceiver;
a memory; and
a processor, wherein the processor is configured to:
establish an NFC peer to peer link with a target NFC device;
transmit a first configuration frame comprising IP configuration parameters associated with the initiator NFC device to the target NFC device via the transceiver;
receive a second configuration frame comprising IP configuration parameters associated with the target NFC device via the transceiver in response to the first configuration frame;
identify whether a first IP address of the initiator NFC device comprised in the first configuration frame is identical to a second IP address of the target NFC device comprised in the second configuration frame;
transmit, if the first IP address of the initiator NFC device is identical to the second IP address of the target NFC device, a message indicating failure to the target NFC device and identify a third IP address of the initiator NFC device to transmit the third IP address to the target NEC device;
set up an IP communication with the target NFC device over the transceiver based on the IP configuration parameters associated with the target NFC device; and
exchange IP data with the target NFC device over the transceiver in an NFC peer-to-peer mode if the IP communication is set up.

13. The initiator NFC device of claim 12, wherein IP configuration parameters associated with the initiator NFC device comprise a configuration frame type, the first IP address, a role, and a network interface type.

14. The initiator NFC device of claim 13, wherein the role is selected from the group consisting of an Adhoc, and device with wider network connectivity.

15. The initiator NFC device of claim 13, wherein the first IP address comprises one of an IPV4 address and IPv6 address.

16. The initiator NFC device of claim 12, wherein the IP configuration parameters associated with the initiator NFC device comprise a configuration frame type, the first IP address of the initiator NFC device, a role associated with the initiator NFC device, and a network interface type supported by the initiator NFC device.

17. The initiator NFC device of claim 16, wherein the IP configuration parameters associated with the target NFC device comprise a configuration frame type, the second IP address of the target NFC device, a role associated with the target NFC device, and a network interface type supported by the target NFC device.

18. The initiator NFC device of claim 12, wherein the processor is further configured to transmit at least one IP data packet comprising IP data to the initiator NFC device over the transceiver in the NFC peer-to-peer mode using the IP configuration parameters associated with the initiator NFC device.

19. The initiator NFC device of claim 18, wherein the processor is further configured to:
receive a request to provide access to a global network from the initiator NFC device;
fetch IP data from the global network based on the request received from the initiator NFC device;
encapsulate the fetched IP data in a payload of a packet data unfit; and
transmit the packet data unit comprising the fetched IP data to the initiator NFC device over the transceiver in the NFC peer-to-peer mode.

20. The initiator NFC device of claim 12, wherein the processor is further configured to:
determine whether the initiator NFC device is connected to a global network based on the IP configuration parameters associated with the initiator NFC device;
send a request to provide access to the global network to the initiator NFC device if the initiator NFC device is connected to the global network; and
receive at least one IP data packet comprising IP data from the initiator NFC device over the transceiver.

21. The initiator NFC device of claim 12, wherein the processor is further configured to dynamically generate an address resolution protocol (ARP) table based on the IP configuration parameters in the first configuration frame.

22. The initiator NFC device of claim 12, wherein the processor is further configured to dynamically resolve duplicate addresses based on the IP configuration parameters in the first configuration frame.

* * * * *